H. S. VOTAW.
DERAILING GUARD.
APPLICATION FILED JAN. 27, 1921.

1,391,223. Patented Sept. 20, 1921.

Inventor
Homer S. Votaw
By Herbert E. Smith
Attorney

UNITED STATES PATENT OFFICE.

HOMER S. VOTAW, OF CHOPAKA, WASHINGTON.

DERAILING-GUARD.

1,391,223.                    Specification of Letters Patent.    Patented Sept. 20, 1921.

Application filed January 27, 1921. Serial No. 440,352.

*To all whom it may concern:*

Be it known that I, HOMER S. VOTAW, a citizen of the United States, residing at Chopaka, in Okanogan county and State of Washington, have invented certain new and useful Improvements in Derailing-Guards, of which the following is a specification.

My present invention relates to improvements in derailing guards or supplemental truck wheels carried by the trucks of railway cars in inoperative position during normal travel of the car, but arranged to be operative under abnormal conditions, as when the car wheels are derailed or leave the car tracks.

The primary object of the invention is the provision of a simple but effective and reliable auxiliary device or attachment to the truck, which may be formed as an integral part of the truck for supporting supplemental wheels which are utilized, and which because of its minimum number of parts and compact arrangement will not add materially to the cost of manufacturing the car trucks, and will not present objectionable or movable parts that are likely to become deranged or destroyed during normal travel.

To this end the invention consists in certain novel combinations and arrangements in connection with the usual or standard form of car trucks as will be hereinafter more fully pointed out and claimed.

In the accompanying drawings I have illustrated one complete example of the physical embodiment of my invention in a converted freight car truck in which the parts are combined and arranged according to the best mode I have thus far devised for the practical application of the principles of my invention.

Figure 1:
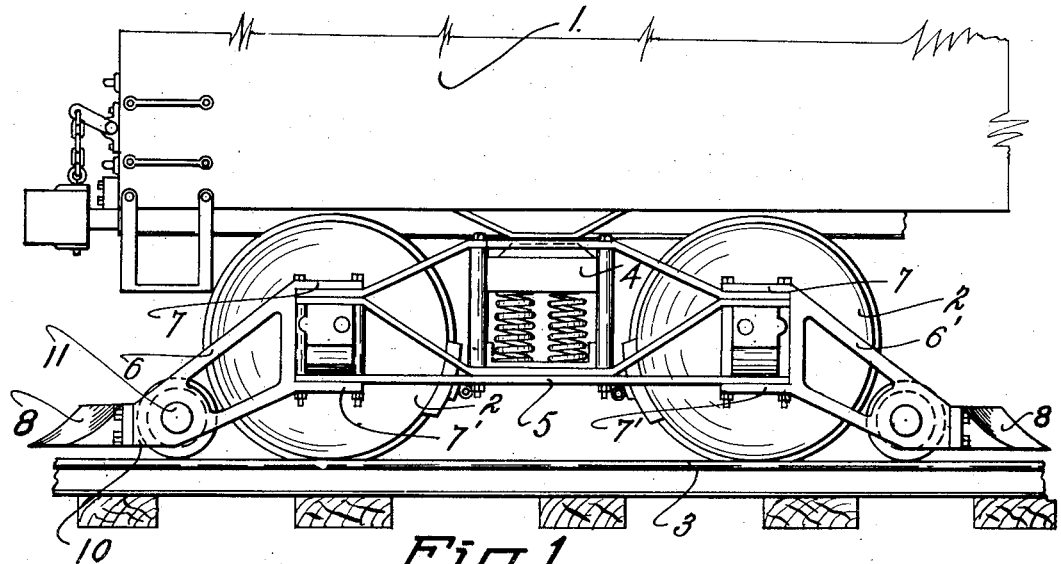
Figure 1 is a side view at one end of a freight car showing a truck converted and utilizing my invention.

For convenience in understanding my invention I have illustrated a portion of a freight car as 1 which is of usual or standard construction and provided with traction wheels 2 of a four wheel truck on the track rails 3. The bolster 4 of the truck has a pair of side frames 5 here illustrated as of the diamond type, and each of these frames is provided with a front extension 6 and rear extension 6'. These extensions project downwardly from the side frames outside the wheels and may be bolted as at 7 and 7' to the pedestal portion of the side frames, as shown in Fig. 1 of the drawings, or the extensions may be integral portions of the side frames which may be manufactured, each in a single integral piece.

Figure 3:
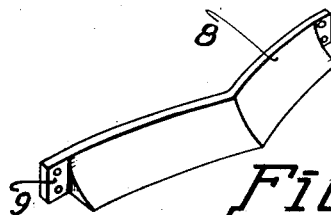
Fig. 3 is a perspective view of one of the transverse truck beams, fashioned as a fender.
Figure 4:
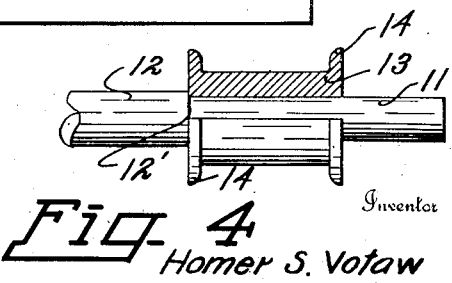
Fig. 4 is a detail view, partly in section showing the manner of journaling one of the supplemental wheels on its axle.

Each of the pairs of extensions are joined by a transversely extending bar 8, formed as a fender, as in Fig. 3, and provided with end flanges 9 by which they are bolted to the complementary ends of the extensions.

Near their extremities the complementary extensions 6, 6, and 6' 6' are provided with journal openings 10 for the journal ends 11 of the transverse axles 12, and between the shoulders 12' of the axles and the bearings of the extensions are journaled the comparatively wide wheels or rollers 13 having opposed pairs of flanges 14.

Figure 2:
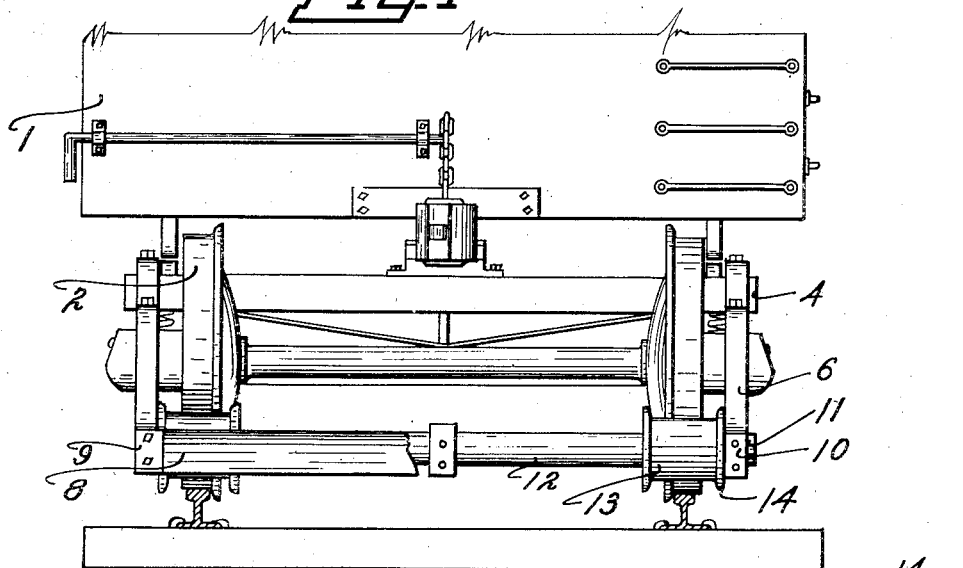
Fig. 2 is an end view of the car shown in Fig. 1.

The extensions are arranged in position to maintain the wheels 13 in elevated position, under normal conditions directly over the track rails, and in Fig. 2 it will be apparent that the supplemental wheels 13 are of sufficient length to extend laterally at both sides of the rail over which they are located. The supplemental wheels are laterally immovable and are retained on their journals between the shoulders 12' and the journal bearings of the extensions of the side frames. The supplemental wheels, however are of sufficient length or width to insure their contact with the rails beneath them should the car wheels 2 leave the track, and the elevation of the supplemental wheels above the rails is slight in order that these wheels may with surety fall on the track rails and be retained thereon by their flanges 14. Thus should the wheels 2 be derailed for any reason the four supplemental wheels will encounter the track rails and retain the truck in normal position, thus preventing destruction and damage. Under usual conditions, the cross bars 8, in addition to performing their functions as fenders, also form rigid braces for the front and rear ends of the trucks or truck frames.

Having thus fully described my invention, what I claim as new and desire to secure by Letters Patent is—

1. The combination with a railway car truck including its side frames, of complementary extensions thereon formed with journal bearings, an axle having journals in said bearings, wide, flanged wheels on said journals and shoulders on the axle co-acting with the extensions for retaining said wheels, and a fender bar having its ends attached at the extremities of said extensions.

2. The combination in a railway car truck of side frames having rigid extensions and a transverse fender-brace connecting the ends of said extensions, journal bearings in the extensions, an axle having end shoulders, and journals in said bearings, wide flanged wheels on said journals between said shoulders and extensions, traction wheels for the truck, and said wide wheels adapted to encounter and ride on rails when the truck wheels are derailed.

In testimony whereof I affix my signature.

HOMER S. VOTAW.